United States Patent
Miyasaka et al.

(10) Patent No.: US 8,830,274 B2
(45) Date of Patent: Sep. 9, 2014

(54) INFORMATION DISPLAY DEVICE

(75) Inventors: Mineki Miyasaka, Yokohama (JP); Joko Sato, Kawasaki (JP); Maki Toida, Kokubunji (JP); Yuichi Matsumoto, Kawasaki (JP)

(73) Assignee: Pioneer Corporation, Kawasaki-shi (JP)

( * ) Notice: Subject to any disclaimer, the term of this patent is extended or adjusted under 35 U.S.C. 154(b) by 444 days.

(21) Appl. No.: 13/378,822

(22) PCT Filed: Jun. 18, 2009

(86) PCT No.: PCT/JP2009/061090
§ 371 (c)(1),
(2), (4) Date: Feb. 8, 2012

(87) PCT Pub. No.: WO2010/146684
PCT Pub. Date: Dec. 23, 2010

(65) Prior Publication Data
US 2012/0139935 A1 Jun. 7, 2012

(51) Int. Cl.
G09G 5/00 (2006.01)
G06F 3/0485 (2013.01)
G06F 3/0488 (2013.01)

(52) U.S. Cl.
CPC .......... *G06F 3/0485* (2013.01); *G06F 3/0488* (2013.01)
USPC ....................................... 345/688

(58) Field of Classification Search
None
See application file for complete search history.

(56) References Cited

U.S. PATENT DOCUMENTS 6,215,491 B1 * 4/2001 Gould .......................... 345/660
7,698,652 B2 * 4/2010 Sagar ............................ 715/787

FOREIGN PATENT DOCUMENTS

| JP | 2000-172403 | 6/2000 |
| JP | 2004-62648 | 2/2004 |
| JP | 2005-234663 | 9/2005 |
| JP | 2008-71118 | 3/2008 |
| JP | 2008-97202 | 4/2008 |

OTHER PUBLICATIONS

Official Communication (2 pgs.) dated Aug. 6, 2013 issued in corresponding Japanese Application No. 2011-519362 with an at least partial English-language translation thereof (2 pgs.).
International Search Report for PCT/JP2009/061090 with translation mailed Jul. 14, 2009.

* cited by examiner

Primary Examiner — Ryan R Yang
(74) Attorney, Agent, or Firm — Nixon & Vanderhye P.C.

(57) ABSTRACT

A content playback device 1 displays a content list displayed on a display unit 2 in a first display mode in which list words are identical in size to each other and list buttons are identical in size to each other if a speed of scrolling for the content list is lower than a threshold. If the speed of the scrolling for the content list is equal to or higher than the threshold, the content playback device 1 displays the content list in a second display mode in which list words and list buttons arranged at the middle of the content list are displayed to be larger in size than those displayed in the first display mode with list words and list buttons being gradually reduced in size from the middle to each of the upward and downward directions.

4 Claims, 7 Drawing Sheets

INFORMATION DISPLAY DEVICE

This application is the U.S. national phase of International Application No. PCT/JP2009/061090 filed 18 Jun. 2009 which designated the U.S., the entire contents of each of which are hereby incorporated by reference.

TECHNICAL FIELD OF THE INVENTION

The present invention relates to an information display device using a touch panel as its display screen, and more particularly, to such an information display device that scrolls a list according to operations via the touch panel.

BACKGROUND ART

For enjoyment of music in a vehicle, such as a motor vehicle, a list of information of songs, such as their titles and the like, can be displayed on a display device, such as an LCD, installed in the vehicle. On the list, a desired song can be selected.

For enjoyment of music with a mobile music player, a list of information of songs, such as their titles and the like, can be displayed the screen of the mobile music player. On the list, a desired song can be selected.

DISCLOSURE OF THE INVENTION

Problems to be Solved by the Invention

However, if a large number of songs are displayed as a list, some display-sized scrolls or long-time scrolling are required to retrieve a desired song.

Particularly, because the screen of an in-vehicle display device or a mobile music player is small in size, a lot of titles cannot be displayed on the screen. This may result in that scrolling takes a lot of effort.

In addition, an increase of scrolling speed can reduce time to reach a desired target to be retrieved. However, in this case, it may be difficult to find out a desired target to be retrieved in a list of music information with the list being scrolled.

The present invention has been made in view of the aforementioned circumstances, and has an example of a purpose of the present invention, which allows a desired target in a scrolled list to be easily found out.

Means for Solving the Problems

In order to achieve such a purpose provided above, a first aspect of the present invention is an information display device that displays, on a display unit with a touch panel, a list in which a plurality of pieces of identification information to be retrieved are arranged in a first direction, and scrolls the displayed list by an operation via the touch panel in one of the first direction and a second direction opposite to the first direction. The information display device includes an operational information determining means that determines operational information based on a user-touched position on the touch panel; a scroll speed detecting means that detects, if it is determined that there is scrolling in one of the first direction and the second direction based on the operational information determined by the operational information determining means, a speed of the scrolling; and a display control means. The display control means displays, if the speed of the scrolling is lower than a threshold, the list in a first display mode such that descriptions of the plurality of pieces of the identification information are displayed to be identical in size to each other and description sections of the plurality of pieces of the identification information are displayed to be identical in size to each other while scrolling the list in the one of the first direction and the second direction. The display control means displays, if the speed of the scrolling is equal to or higher than the threshold, the list in a second display mode such that descriptions and description sections of the plurality of pieces of the identification information arranged on a middle of the list are displayed to be larger in size than those displayed in the first display mode with descriptions and description sections of the plurality of pieces of the identification information being gradually reduced in size from a middle of the list to each of the first and second directions while scrolling the list in the one of the first direction and the second direction.

EMBODIMENTS FOR CARRYING OUT THE INVENTION

An embodiment of the present invention will be described hereinafter with reference to the drawings.

Figure 1:
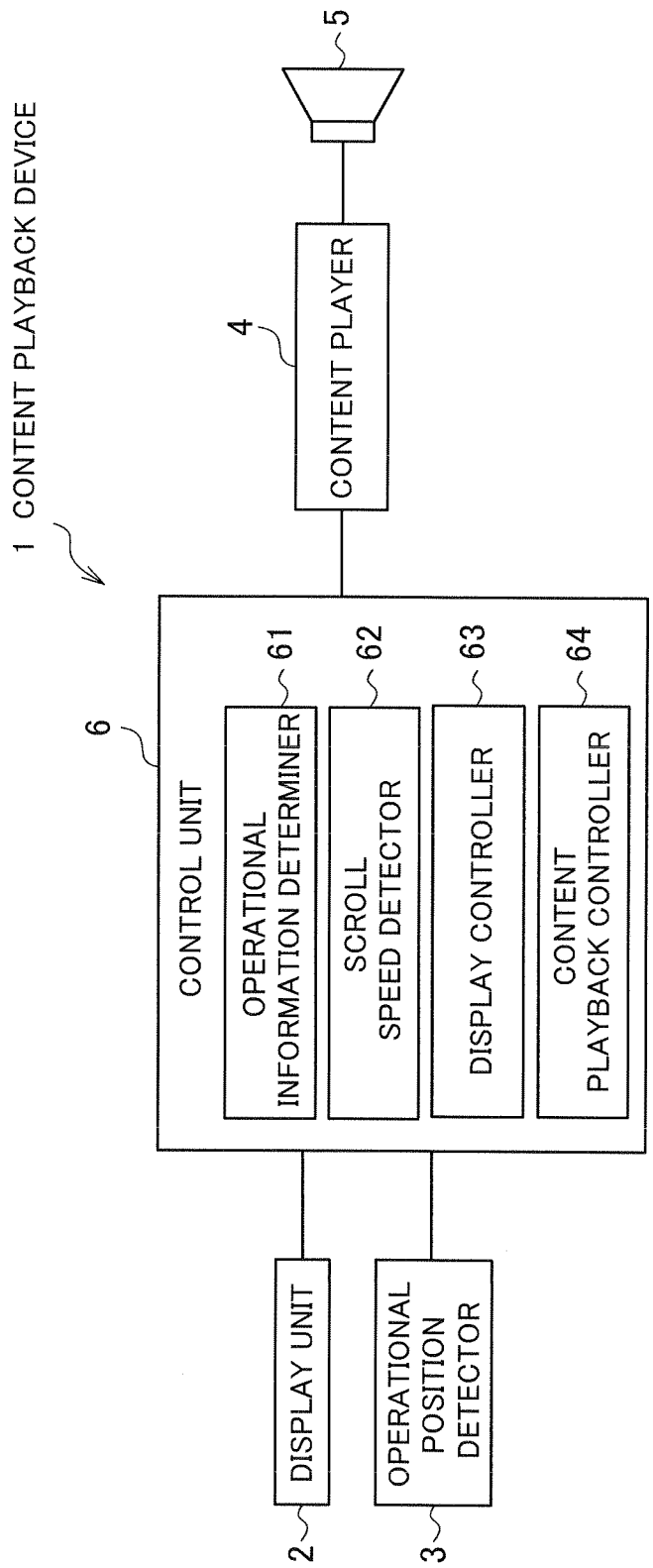
FIG. 1 is a schematic structural view of a content playback device according to an embodiment of the present invention.

FIG. 1 is a schematic structural view of a content playback device 1 according to an embodiment of the present invention. The content playback device 1, as illustrated in FIG. 1, schematically includes a display unit 2, an operational position detector 3, a content player 4, a speaker 5, and a control unit 6. The content playback device 1 is a device that plays back music contents, and is adapted to display a list 7 of music contents, hereinafter, referred to as a content list 7, on the screen of the content playback device 1. This allows a desired music content to be selected, and the selected music content to be played back. Note that, in this embodiment, the screen is provided with a touch panel input interface, which allows users to provide instructions to the content playback device 1 via the touch panel.

In this embodiment, the content playback device 1 is described as one function of a content playback device installed in a vehicle, such as a motor vehicle, and provided with functions of a navigation system, a television receiver, a DVD player, and an audio player (a CD player or a HDD player), but the content playback device 1 is not limited to such a content playback device for vehicles. As the content playback device 1, any kind of content playback device provided with a touch panel screen and able to play back music contents can be used. For example, a mobile music player or a mobile information terminal can be used as the content playback device 1. In this embodiment, music contents are handled as targets to be retrieved in a list, but other contents can be used as targets to be retrieved in a list. For example, a list of facility information, such as restaurants and shops, can be used so that the facility information can be handled as targets to be retrieved.

The display unit 2 is, for example, an output interface comprised of a display, such as a color liquid crystal display (LCD). In this embodiment, a content list 7 of music contents stored in a hard disk of the content playback device 1 or the like is to be displayed on the screen of the display unit 2.

The operational position detector 3 is, for example, comprised of a touch panel arranged on the screen of the display unit 2, and serves as an input interface that allows touching of operation information, such as content images, operation buttons, and icons, to input information. Specifically, the operational position detector 3 is adapted to detect an operational position on the screen touched by a user, and output information of the detected position to the control unit 6.

The content player 4 is, for example, comprised of an audio player (a CD player or an HDD player), and adapted to play back music contents.

The speaker 5 is adapted to output sounds of regenerated contents by the content player 4.

The control unit 6 is, for example, comprised of a CPU, a ROM, a RAM, and so on, and adapted to perform the overall control of the content playback device 1. Specifically, the control unit 6 is comprised of an operational information determiner 61, a scroll speed detector 62, a display controller 63, and a content playback controller 64.

The operational condition determiner 61 is adapted to determine information operationally instructed by operators based on positional information outputted from the operational position detector 3. In this embodiment, the operational position detector 3 is adapted to detect upward/downward scrolling of the content list 7 displayed on the display unit 2 with a finger, selection of a desired music title with a finger, and the like. For example, when the title A of a song in the content list 7 displayed on the screen is touched with a finger of a user, it is determined that playback of the song whose title A is instructed according to the touched position. In addition, when a finger is uninterruptedly moved upward while the finger touches the content list 7, it is determined that the content list 7 is scrolled upward.

The scroll speed detector 62 is adapted to, when the operational information determiner 61 determines that operational information is scrolling, detect the speed of the scrolling. Specifically, the scroll speed detector 62 determines whether the speed of upward scrolling or downward scrolling is equal to or higher than a threshold.

The display controller 63 performs display control of the display unit 2. Specifically, when the operational information determiner 61 determines that operational information is scrolling, the display controller 63 changes display mode to scroll the content list 7 according to the scroll speed detected by the scroll speed detector 62. That is, according to the case where the speed of upward scrolling or downward scrolling is equal to or higher than the threshold or the case where the speed of upward scrolling or downward scrolling is lower than the threshold, the display controller 63 displays the content list 7 in two types of display modes. The two types of display modes will be described later.

The content playback controller 64 controls the content player 4 based on operational information determined by the operational information determiner 61. For example, when the operational information represents playback of a selected song, the content playback controller 64 plays back the selected song.

Figure 2:
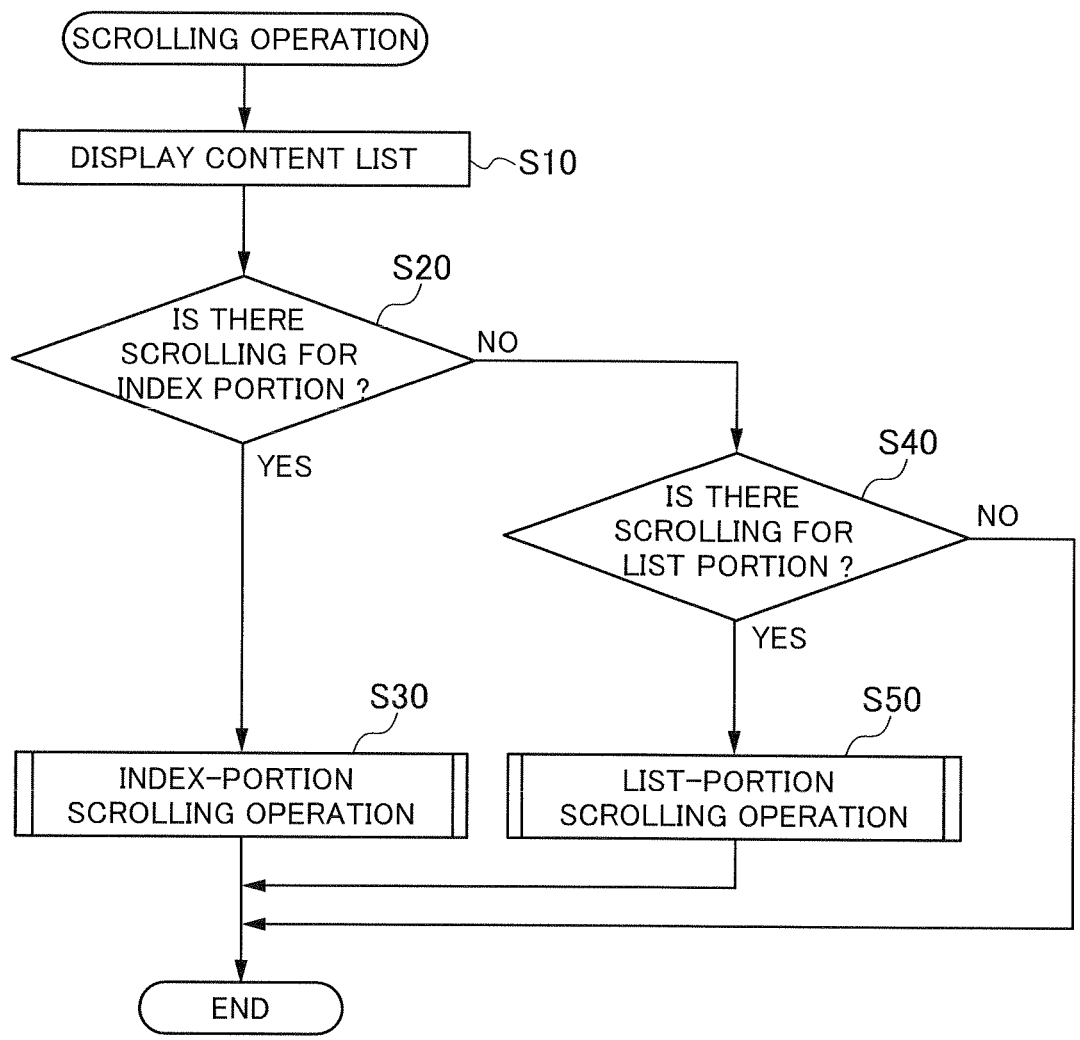
FIG. 2 is a flowchart illustrating the flow of scrolling operations of the content playback device according to the embodiment of the present invention.
Figure 3:
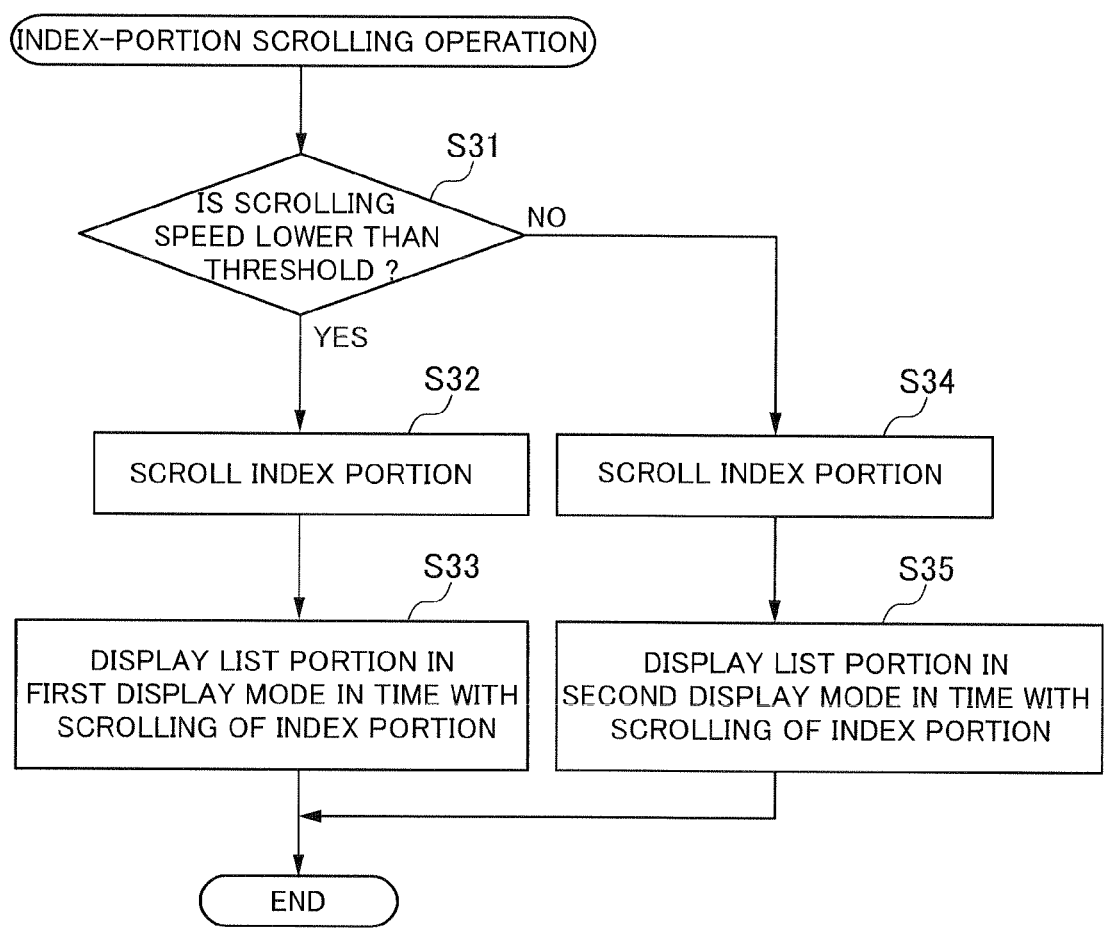
FIG. 3 is a flowchart fully illustrating the flow of index-portion scrolling operations in step S30 of FIG. 2.
Figure 4:
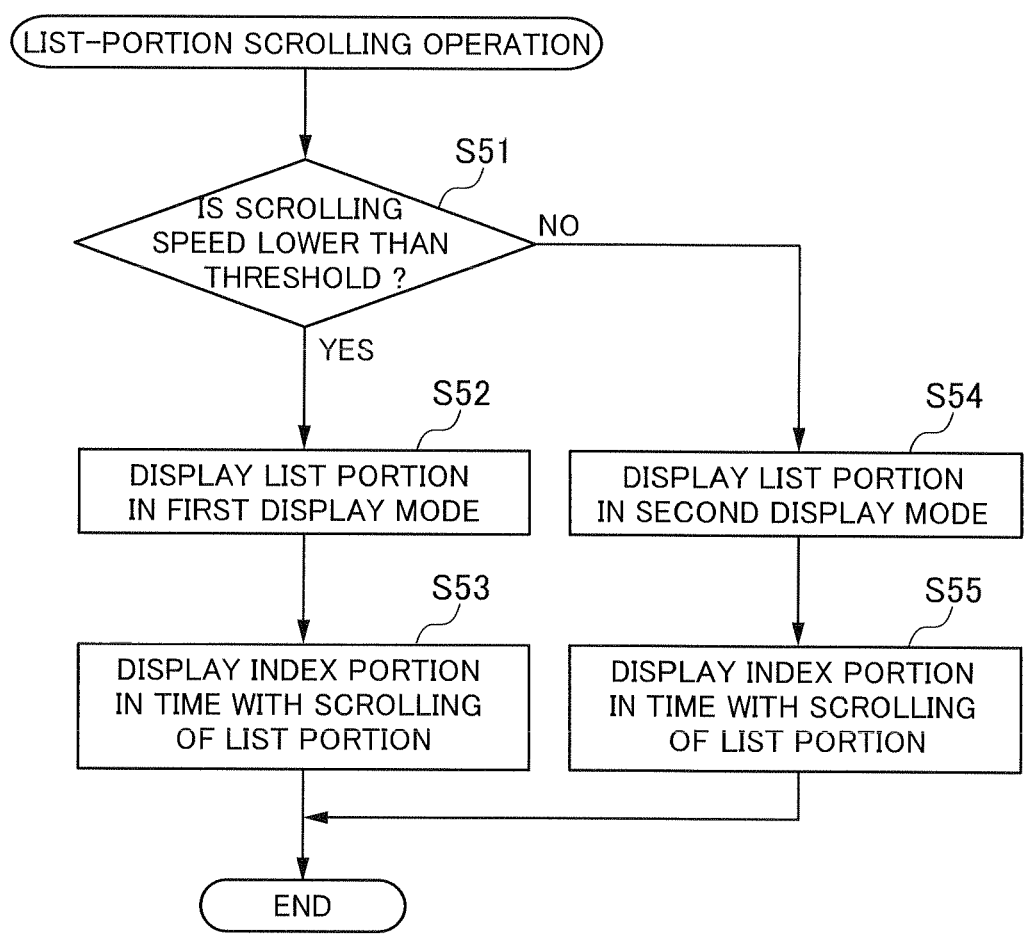
FIG. 4 is a flowchart fully illustrating the flow of list-portion scrolling operations in step S50 of FIG. 2.

Next, scrolling operations of the content list 7 by the content playback device 1 according to this embodiment will be described with reference to FIGS. 2 to 9. FIG. 2 is a flowchart illustrating the flow of the scrolling operations. FIG. 3 is a flowchart fully illustrating the flow of index-portion scrolling operations in step S30 of FIG. 2. FIG. 4 is a flowchart fully illustrating the flow of list-portion scrolling operations in step S50 of FIG. 2. FIGS. 5 to 9 illustrate examples of screen pages displayed on the display unit 2, which represent the display modes of the content list 7.

First, the scrolling operations of the content playback device 1 will be described with reference to FIG. 2.

When accepting the request of content-list display from a user, the content playback device 1 displays the content list 7 on the display unit 2 (see step S10).

Figure 5:
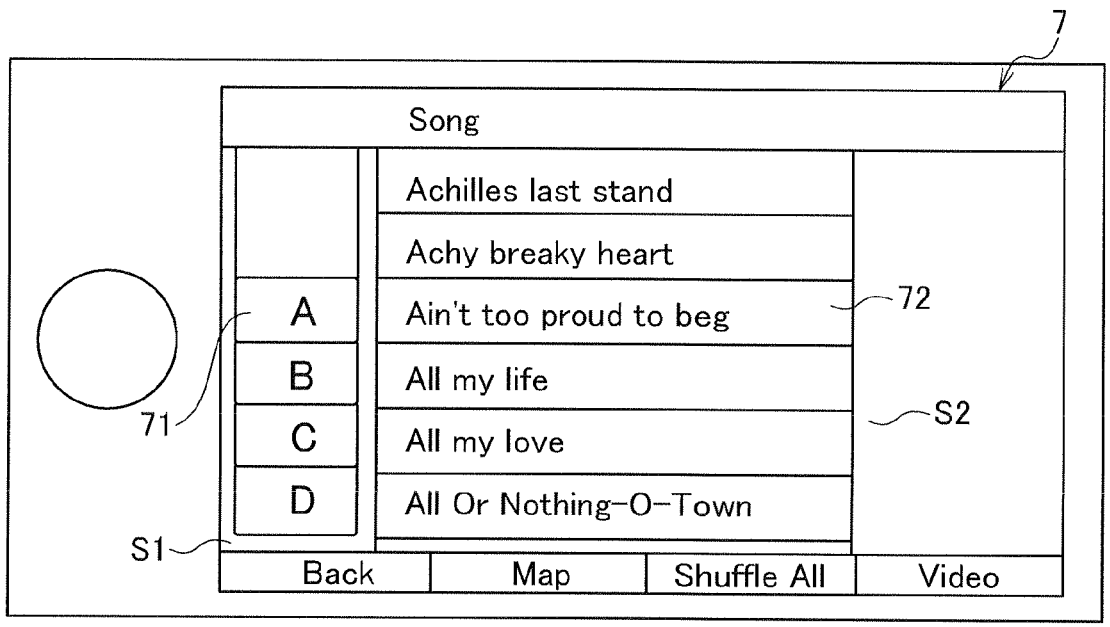
FIG. 5 is a view of an example of screen pages displayed by the scrolling operations of the content playback device according to the embodiment of the present invention.

The content list 7 is illustrated in FIG. 5. In this embodiment, the content list 7 is displayed as a hierarchical structure, and includes an index portion 71 that displays indexes of music titles, and a list portion 72 that displays a list of music titles. The indexes of music titles are capital letters of these music titles. Specifically, the index portion 71 is displayed on an index-portion display area S1 at the left part of the screen page, and the list portion 71 is displayed on a list-portion display area S2 at the substantially center part of the screen page. A list of music titles corresponding to a focused index-letter in the index portion 71 is displayed on the list portion 72. In this embodiment, a slightly upper portion of the center of the screen page is focused. For example, in FIG. 5, the index letter "A" is focused.

Note that, when the content list 72 is initially displayed, music-title sections (rectangular list boxes) displayed on the list portion 72 are identical in size to each other, and letters (list words) displayed in the respective music title sections are identical in size to each other. Hereinafter, this display mode of the content list 7 will be referred to as a first display mode.

Next, the content playback device 1 determines whether there is upward/downward scrolling for the index portion 71 from a user in step S20. If there is upward/downward scrolling for the index portion 71 from a user (YES in step S20), the content playback device 1 performs the index-portion scrolling operations described later in step S30.

If there is not upward/downward scrolling for the index portion 71 from a user (NO in step S20), the content playback device 1 determines whether there is upward/downward scrolling for the list portion 72 from a user in step S40. If there is upward/downward scrolling for the list portion 72 from a user (YES in step S40), the content playback device 1 performs the list-portion scrolling operations described later in step S50. If there is not upward/downward scrolling for the list portion 72 from a user (NO in step S40), the content playback device 1 terminates the scrolling operations.

Next, the index-portion scrolling operations will be described in detail with reference to FIG. 3.

The content playback device 1 determines whether the speed of the upward/downward scrolling for the index portion 71 is lower than a threshold in step S31.

Figure 6:
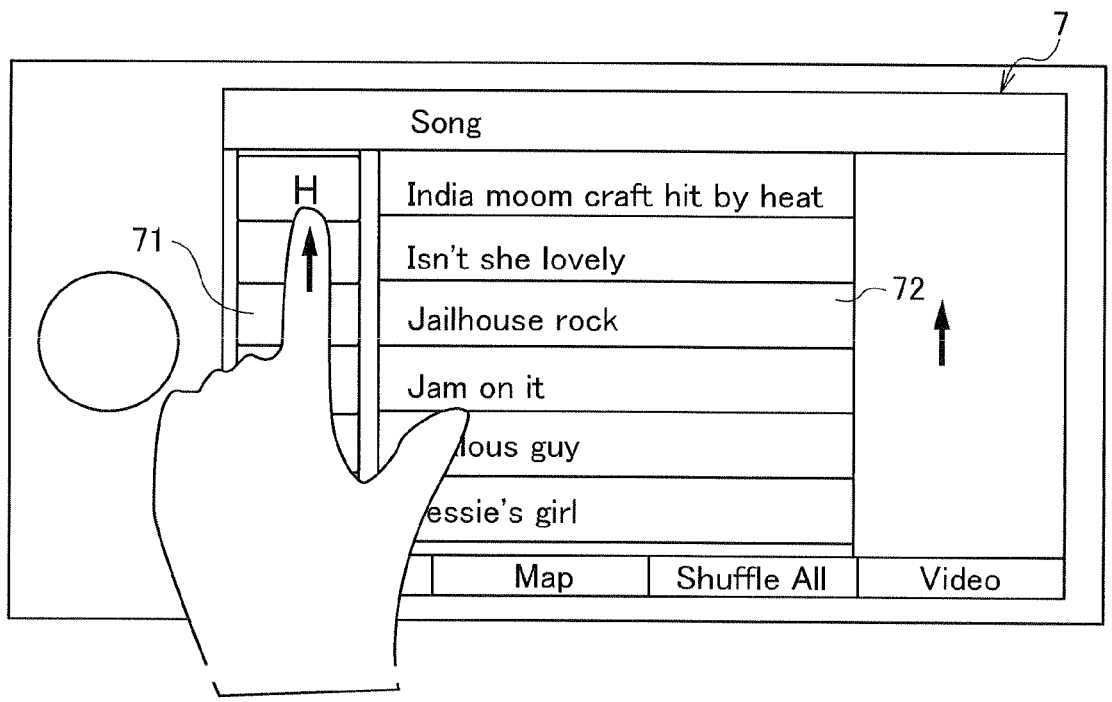
FIG. 6 is a view of an alternative example of screen pages displayed by the scrolling operations of the content playback device according to the embodiment of the present invention.

If the upward/downward scrolling speed is lower than the threshold (YES in step S31), the content playback device 1 scrolls the index portion 71 in time with the scrolling of the index portion 71 in step S32, and displays the list portion 72 in the first display mode in time with the scrolling of the index portion 71 in step S33. FIG. 6 illustrates the display mode of the content list 7 if the upward scroll speed for the index portion 71 is lower than the threshold. As illustrated in FIG. 6, the list portion 7 is displayed in the first display mode while being scrolled upward.

Otherwise, if the upward/downward scrolling speed is equal to or higher than the threshold (NO in step S31), the content playback device 1 scrolls the index portion 71 in time with the scrolling of the index portion 71 in step S34, and displays the list portion 72 in a second display mode in time with the scrolling of the index portion 71.

Here, the second display mode is a display mode in which the music-title sections (rectangular list boxes) displayed on the list portion 72 are different in size, and the letters (list words) displayed in the respective music title sections are different in size.

Specifically, music-title sections (rectangular list boxes) displayed on the middle of the screen page in the vertical direction are larger in size than those displayed in the first display mode, and the letters (list words) in the music-title sections (rectangular list boxes) displayed on the middle of the screen page in the vertical direction are larger in size than those displayed in the first display mode. In addition, in the second display mode, music-title sections (rectangular list boxes) are gradually reduced in size from the middle of the screen page to each of the upper and lower ends of the screen page, and the letters (list words) displayed in the music-title sections (rectangular list boxes) are gradually reduced in size from the middle of the screen page to each of the upper and lower ends of the screen page. This increases the visibility of the middle of the screen page. That is, in the second mode, the music-title section located at the middle is displayed to be largest in size in all the music-title sections, and the letters displayed in the music-title section located at the middle is displayed to be largest in size in all the letters displayed in all the music-title sections.

Note that, in the second display mode of this embodiment, the visibility of the middle of the screen page in its vertical direction is also increased in view of brightness of the screen page. Specifically, the brightness of the middle of the screen page in its vertical direction is increased with the screen page being gradually reduced in brightness from the middle to each of the upper end and lower end of the screen page.

Figure 7:
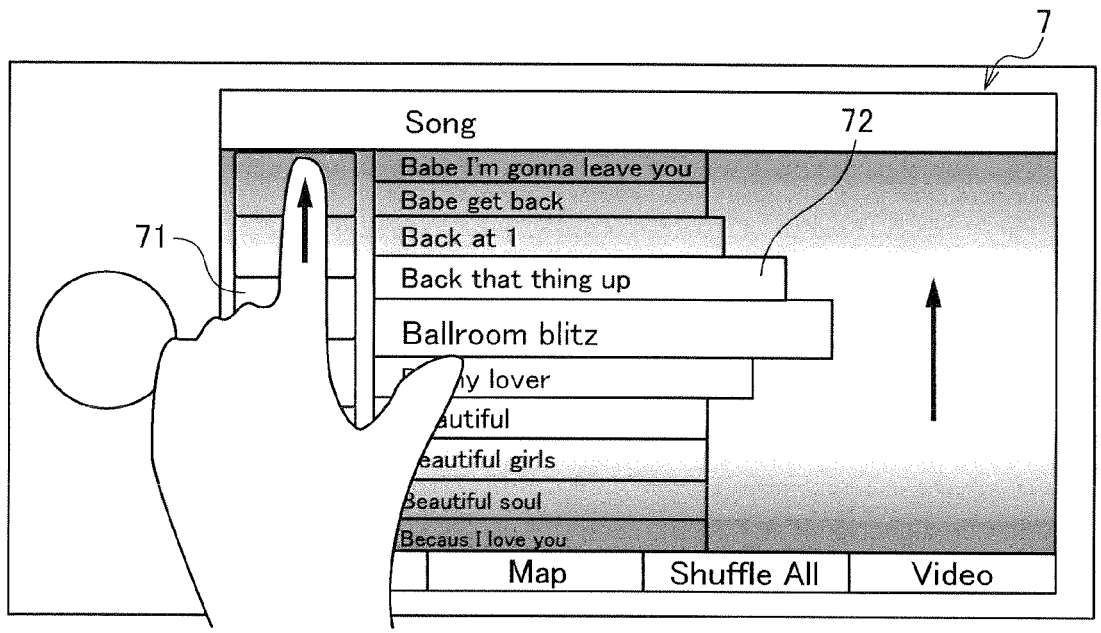
FIG. 7 is a view of a further example of screen pages displayed by the scrolling operations of the content playback device according to the embodiment of the present invention.

FIG. 7 illustrates the display mode of the content list 7 if the upward scroll speed for the index portion 71 is equal to or higher than the threshold. As illustrated in FIG. 7, the list portion 72 is displayed in the second display mode while being scrolled upward. As illustrated in FIGS. 6 and 7, the number of music contents displayed in the list portion 72 in the second display mode is larger than that of music contents displayed in the first display mode. That is, the second display mode displays a lot of music titles in one screen page while highlighting some titles displayed at the middle portion of the one screen page.

Next, the list-portion scrolling operations will be described in detail with reference to FIG. 4.

The content playback device 1 determines whether the speed of the upward/downward scrolling for the list portion 72 is lower than a threshold in step S51.

Figure 8:
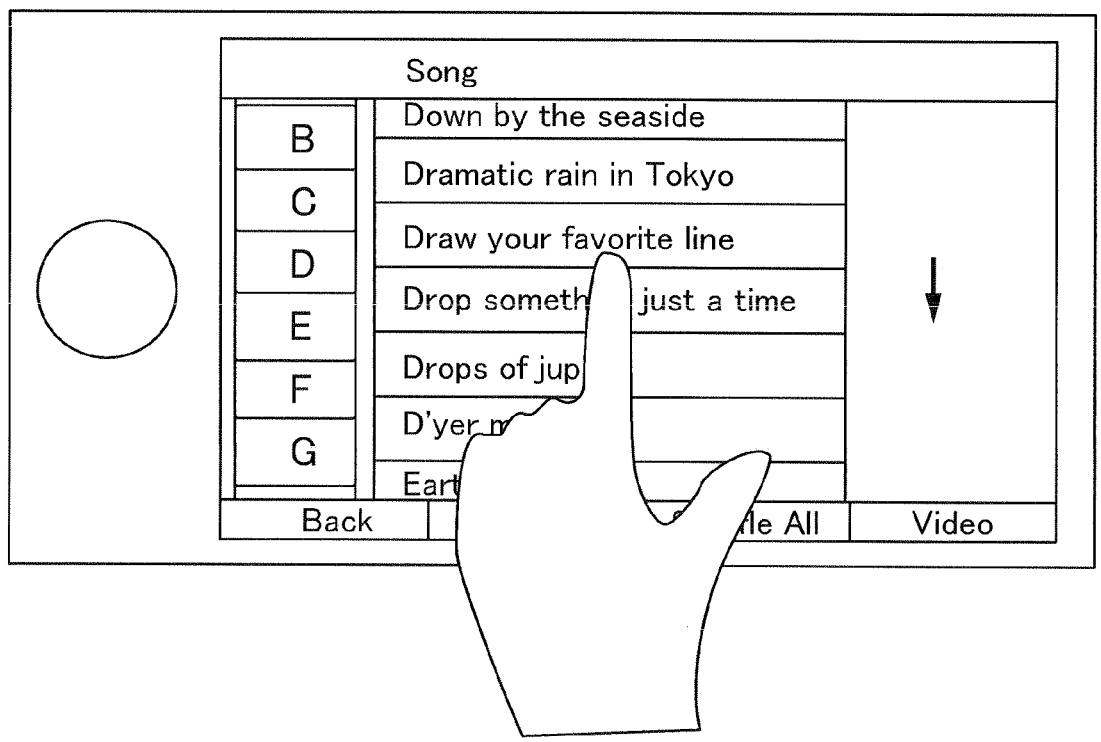
FIG. 8 is a view of a still further example of screen pages displayed by the scrolling operations of the content playback device according to the embodiment of the present invention.

If the upward/downward scrolling speed is lower than the threshold (YES in step S51), the content playback device 1 displays the list portion 72 in the first display mode in time with the scrolling of the list portion 72 in step S52, and scrolls the index portion 71 in time with the scrolling of the list portion 72 in step S53. FIG. 8 illustrates the display mode of the content list 7 if the downward scroll speed for the list portion 72 is lower than the threshold. As illustrated in FIG. 8, the list portion 72 is displayed in the first display mode while being scrolled downward.

Otherwise, if the upward/downward scrolling speed is equal to or higher than the threshold (NO in step S51), the content playback device 1 displays the list portion 72 in the second display mode in time with the scrolling of the list portion 72 in step S54, and scrolls the index portion 71 in time with the scrolling of the list portion 72 in step S55.

Figure 9:
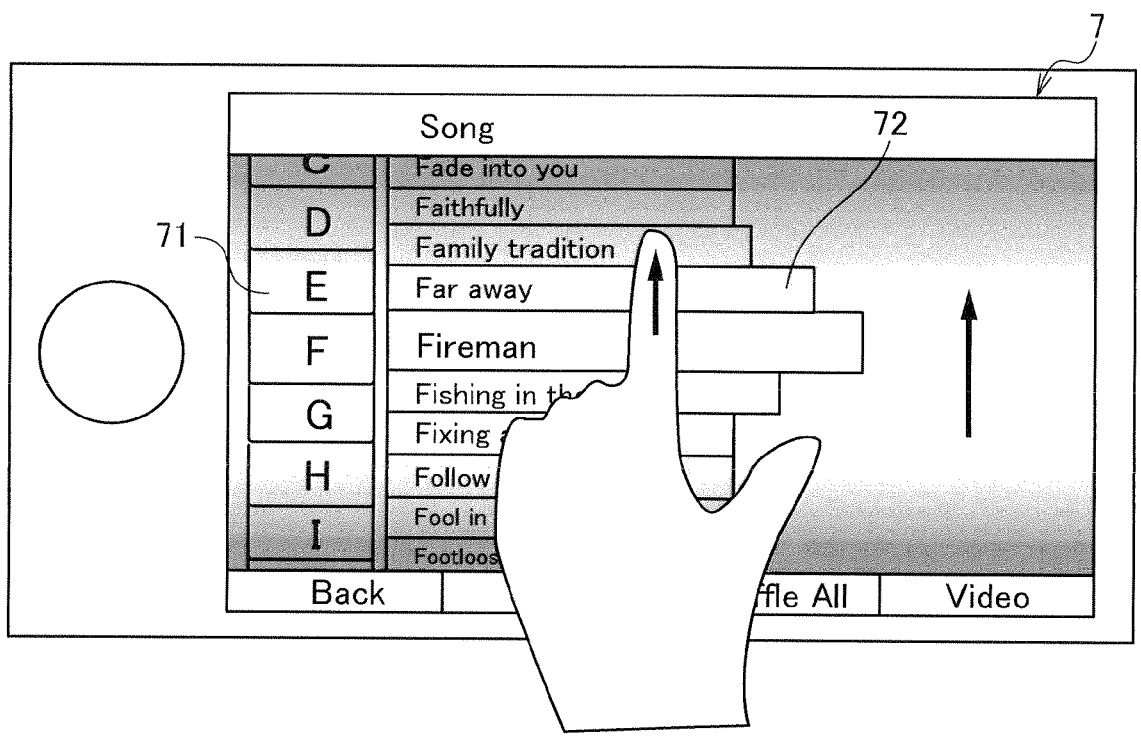
FIG. 9 is a view of a still further example of screen pages displayed by the scrolling operations of the content playback device according to the embodiment of the present invention.

FIG. 9 illustrates the display mode of the content list 7 if the upward scroll speed for the list portion 72 is equal to or higher than the threshold. As illustrated in FIG. 9, the list portion 72 is displayed in the second display mode while being scrolled upward.

As described above, if the speed of scrolling for the index portion 71 or the list portion 72 of a content list 7 is lower than a threshold, this embodiment displays the content list 7 in the first display mode such that list buttons displayed in the list unit 72 are identical in size to each other, and list words displayed in the list unit 72 are identical in size to each other.

If the speed of scrolling for the index portion 71 or the list portion 72 of the content list 7 is equal to or higher than the threshold, this embodiment displays the content list 7 in the second display mode such that:

list buttons displayed on the middle of the list unit 72 are larger in size than those displayed in the first display mode with the list words in the list buttons being larger in size than those displayed in the first display mode; and list buttons are gradually reduced in size from the middle to each of the upper end and the lower end with the list words displayed in the list buttons being gradually reduced in size from the middle to each of the upper end and the lower end.

Thus, it is possible to easily find out a desired title in the scrolled content list 7 even if the scroll speed of the content list 7 takes any value.

Note that, in this embodiment, display control over scrolling has been described when the content playback device 1 for displaying a content list 7 on the display unit 2 is taken as an example thereof, but the display control over scrolling according to the present invention is not limited thereto. Specifically, the display control over scrolling according to the present invention can be applied to any apparatus, method, or program, which displays a list of predetermined information (information identifiable from other information) while scrolling the list according to scrolling; the predetermined information will be referred to as identification information). These applications allow the display mode of the identification information to be controlled according to the scrolling speed.

Specifically, if the scrolling speed is late, a list in which descriptions of the identification information are identical in size to each other and description sections of the identification information are identical in size to each other is scrolled. Thus, a user can easily find out a desired piece of the identification information. Otherwise, if the scrolling speed is fast, descriptions and description sections of the middle of the identification information are increased in size to highlight the descriptions and description sections with descriptions and description sections of each of the upper and lower end of the identification information being reduced in size. This allows users to easily find out a desired piece of the identification information with a lot of pieces of the identification information being scrolled on a screen.

The present invention is not limited to the embodiment set forth above, and the embodiment of the present invention can be deformed or modified within the scope of the present invention. Such deformations or modifications based on the embodiment can be within the technical range of the present invention.

Description Of Characters
1 Content playback device
2 Display unit
3 Operational position detector
4 Content player
5 Speaker
6 Control unit
7 Content list
61 Operational information determiner
62 Scroll speed detector
63 Display controller
64 Content playback controller
71 Index portion
72 List portion

The invention claimed is:

1. An information display device that displays, on a display unit with a touch panel, a list in which a plurality of pieces of identification information to be retrieved are arranged in a first direction, and scrolls the displayed list by an operation via the touch panel in one of the first direction and a second direction opposite to the first direction, the information display device comprising:

an operational information determining means that determines operational information based on a user-touched position on the touch panel;

a scroll speed detecting means that detects, if it is determined that there is scrolling in one of the first direction and the second direction based on the operational information determined by the operational information determining means, a speed of the scrolling; and a display control means that:

displays, if the speed of the scrolling is lower than a threshold, the list in a first display mode such that descriptions of the plurality of pieces of the identification information are displayed to be identical in size to each other and description sections of the plurality of pieces of the identification information are displayed to be identical in size to each other while scrolling the list in the one of the first direction and the second direction; and displays, if the speed of the scrolling is equal to or higher than the threshold, the list in a second display mode such that a description and a corresponding description section of at least one of the plurality of pieces of the identification information arranged on a middle of the list are displayed to be larger in size than those displayed in the first display mode with descriptions and description sections of at least a number of the plurality of pieces of the identification information being gradually reduced in size from the middle of the list to each of the first and second directions while scrolling the list in the one of the first direction and the second direction.

2. The information display device according to claim 1, wherein the list is comprised of an index portion and a list portion, and designed as a hierarchical structure, each of the index portion and the list portion being scrollable in the first direction and the second direction, the scroll speed detecting means detects a speed of scrolling for one of the index portion and the list portion as the speed of the scrolling, and the display control means displays the list portion in the first display mode if the speed of the scrolling of the one of the index portion and the list portion is lower than the threshold, and displays the list portion in the second display mode if the speed of the scrolling of the one of the index portion and the list portion is equal to or higher than the threshold.

3. The information display device according to claim 1, wherein the display control means displays the middle of the list with predetermined brightness with the list being gradually reduced in brightness from the middle to each of the first and second directions.

4. The information display device according to claim 1, wherein the first direction is a downward direction of the list, and the second direction is an upward direction of the list.

* * * * *